(12) United States Patent
Irani et al.

(10) Patent No.: US 10,440,508 B2
(45) Date of Patent: *Oct. 8, 2019

(54) LOCATION-BASED ORGANIZATIONAL GROUPINGS FOR MANAGEMENT SERVICES

(71) Applicant: AirWatch LLC, Atlanta, GA (US)

(72) Inventors: Santhosh Chandrashekarappa Irani, Bangalore (IN); Dharmesh Guna, Bangalore (IN); Ramani Panchapakesan, Bangalore (IN); Lokeswar Akuthota, Bangalore (IN); Prashant Agrawal, Bangalore (IN)

(73) Assignee: AirWatch, LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/361,642

(22) Filed: Mar. 22, 2019

(65) Prior Publication Data

US 2019/0222956 A1 Jul. 18, 2019

Related U.S. Application Data

(63) Continuation of application No. 15/271,246, filed on Sep. 21, 2016, now Pat. No. 10,278,011.

(51) Int. Cl.
*H04W 4/021* (2018.01)
*H04L 29/08* (2006.01)

(52) U.S. Cl.
CPC ............. *H04W 4/021* (2013.01); *H04L 67/18* (2013.01)

(58) Field of Classification Search
CPC ............... G06Q 30/0241; G06Q 50/01; G06Q 10/063114; G06Q 30/0261; H04L 63/20; H04L 47/20; H04L 47/627; H04L 67/22; H04W 4/021; H04W 4/21; H04W 12/12; H04W 4/029; H04W 4/04; H04W 4/38; H04W 64/00; G08G 1/20
See application file for complete search history.

(56) References Cited

U.S. PATENT DOCUMENTS

| | | | |
|---|---|---|---|
| 9,503,902 B1* | 11/2016 | Coney | H04W 76/10 |
| 2009/0170479 A1* | 7/2009 | Jarenskog | H04M 1/72572 455/414.1 |
| 2012/0088476 A1* | 4/2012 | Greenfield | H04W 4/50 455/414.1 |
| 2015/0312845 A1* | 10/2015 | Teeni | H04W 4/021 455/411 |
| 2018/0124569 A1* | 5/2018 | Shin | G01S 1/00 |

* cited by examiner

*Primary Examiner* — Nizar N Sivji
(74) *Attorney, Agent, or Firm* — Thomas Horstemeyer, LLP

(57) ABSTRACT

Examples relate to devices being managed based on their locations relative to a facility. In some examples, the location of a client device can be determined relative to a facility. An organizational group can be associated with the location. The client device can be associated with the organizational group. Whether the client device complies with a compliance policy associated with the organizational group can be determined.

17 Claims, 5 Drawing Sheets

LOCATION-BASED ORGANIZATIONAL GROUPINGS FOR MANAGEMENT SERVICES

CROSS-REFERENCE TO RELATED APPLICATIONS

This application is a continuation of U.S. patent application Ser. No. 15/271,246, entitled "LOCATION-BASED ORGANIZATIONAL GROUPS FOR MANAGEMENT SERVICES," filed Sep. 21, 2016, which is incorporated herein by reference in its entirety.

BACKGROUND

Individuals often use computing devices to access and modify electronic documents. For example, an individual can operate a laptop computer to obtain and render an electronic word processing document or an electronic spreadsheet. In addition, the user can modify the electronic document using the computing device.

Enterprises, such as businesses, often provide their employees with computing devices for work related purposes. An enterprise can provide its enterprise computing devices with access to enterprise resources, such as enterprise networks, servers, and files. Some companies implement "bring your own device" (BYOD) policies in which employees are allowed to use their personal devices for work purposes.

To reduce security risks and prevent unauthorized access to enterprise resources, enterprises typically enact network and computer security measures. For example, some enterprises require their computing systems to authenticate users prior to providing access to enterprise resources. In addition, enterprises often provide firewalls to prevent unauthorized access to their networks. However, if security measures are not properly implemented and maintained, unauthorized users can potentially access enterprise resources.

Some enterprises implement security measures based on the geographical locations of computing devices. For example, an enterprise can establish a geo-fence, which can be a virtual barrier, around the perimeter of a building associated with the enterprise. If a computing device is located within the geo-fence, the enterprise can permit the computing device to access enterprise resources. If the computing device is outside of the geo-fence, the enterprise can prohibit the computing device from accessing enterprise resources. Although permitting or restricting access to resources based on a geo-fence can improve the security of computing systems associated with the enterprise, existing management services do not enroll computing devices based on the location of a computing device relative to an enterprise facility.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to the enrollment of client devices with a management service based on their locations relative to a facility. In some examples, a stationary client device, such as a "smart" television or a "smart" light bulb having network connectivity, is to enroll with a management service for an enterprise. The client device can provide the management service with information indicative of the geographical location of the client device. The management service can compare the location of the client device with a floor plan for a facility, such as an office building associated with the management service, to determine the location of the client device relative to the facility. For example, the management service can determine that the client device is located in a public waiting room of the facility.

Once the management service determines the location of the client device relative to the facility, the management service can associate the client device with an organizational group based on the determined location. For example, the management service can associate the client device with an organizational group that corresponds to a public waiting room of the facility. The management service can then apply a management policy to the client device, which corresponds to the organizational group. The management policy can specify actions that devices in the organizational group are permitted or required to perform. For example, a management policy for the "public waiting room" can prohibit client devices within the organizational group from displaying confidential enterprise material.

Techniques described herein facilitate enrollment of client devices with a management service based on their locations relative to a facility. The management service can ensure that the client devices are compliant with corresponding management policies and, if not, implement remedial actions to mitigate security risks that may arise as a result of noncompliance. Examples of the present disclosure therefore improve at least the technical fields of device and network security.

In the following discussion, examples of systems and their components are described, followed by examples of the operation of those systems.

Figure 1:
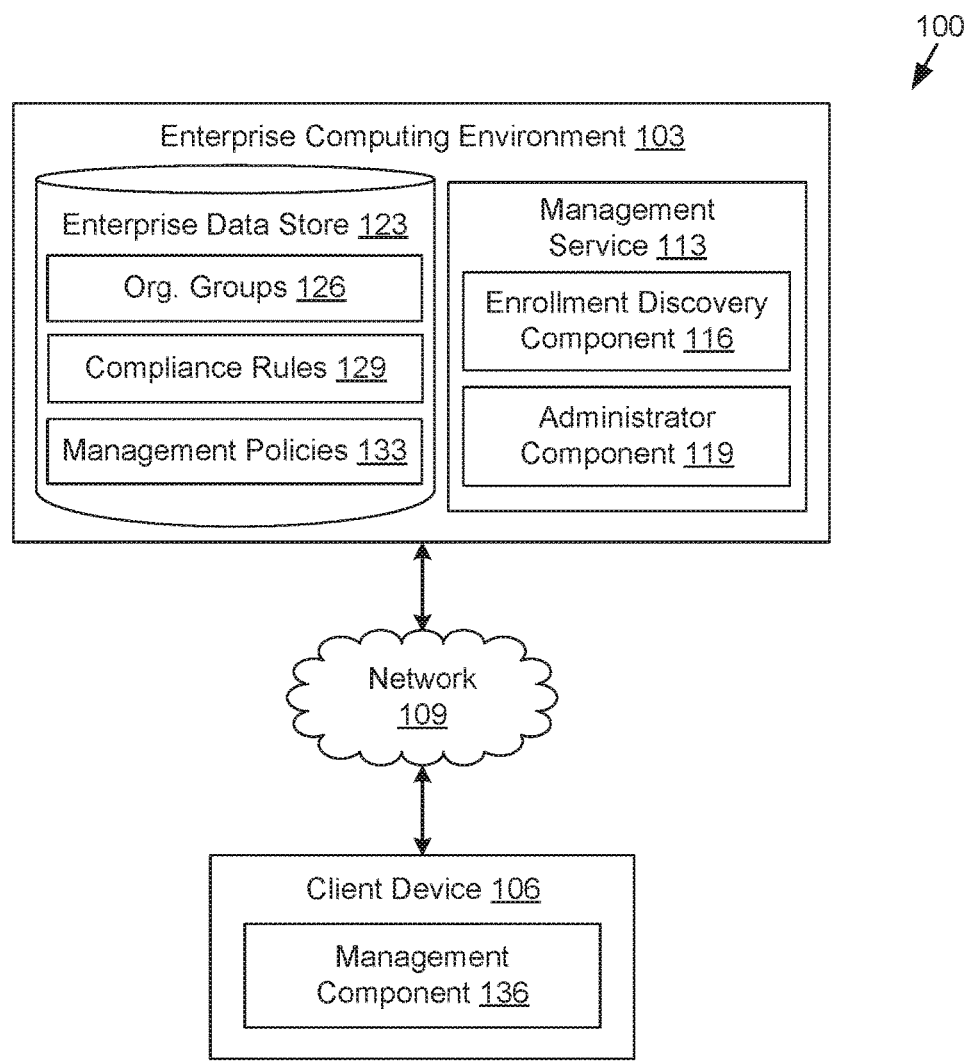
FIG. 1 is a drawing of an example of a networked environment.

With reference to FIG. 1, shown is an example of a networked environment 100. The networked environment 100 can include an enterprise computing environment 103 and a client device 106 in data communication through a network 109. The network 109 can include the Internet, one or more intranets, extranets, wide area networks (WANs), local area networks (LANs), wired networks, wireless networks, or any combination of two or more such networks. The network 109 can include satellite networks, cable networks, Ethernet networks, cellular networks, and telephony networks.

The enterprise computing environment 103 can be a computing system operated by an enterprise, such as a business or other organization. The enterprise computing environment 103 can include a computing device, such as a server computer, that can provide computing capabilities. Alternatively, the enterprise computing environment 103 can include multiple computing devices arranged in one or more server banks or computer banks. For examples in which the enterprise computing environment 103 includes multiple computing devices, the computing devices can be located in a single installation, or the computing devices can be distributed among multiple different geographical locations.

In some examples, the enterprise computing environment 103 can include computing devices that together form a hosted computing resource or a grid computing resource. In other examples, the enterprise computing environment 103 can operate as an elastic computing resource for which the allotted capacity of computing-related resources, such as processing resources, network resources, and storage resources, can vary over time. In other examples, the enterprise computing environment 103 can include or be operated as one or more virtualized computer instances that can be executed in order to perform the functionality that is described herein.

The enterprise computing environment 103 can include a management service 113 that can monitor and manage the operation of client devices 106 associated with the enterprise that operates the enterprise computing environment 103. In some examples, the management service 113 can manage and oversee the operation of multiple client devices 106 enrolled in a device management service that is provided by the management service 113. The management service 113 can also provide client devices 106 with access to email, calendar data, contact information, and other resources associated with the enterprise.

The management service 113 can include an enrollment discovery component 116 and an administrator component 119. The enrollment discovery component 116 can be a system to which a client device 106 can communicate with during the initial stages of enrollment with the management service 113. The management service 113 can provide the client device 106 with an address, such as a uniform resource locator (URL) of the administrator component 119 so that the client device 106 can communicate with the administrator component 119 to continue enrollment with the management service 113. The enrollment discovery component 116 can also provide the client device 106 with a token that can represent that the client device 106 has been authenticated and that the client device 106 is permitted to communicate and enroll with the management service 113.

The administrator component 119 can be a system with which the client device 106 can communicate in order to complete enrollment with the management service 113. The client device 106 can communicate with the administrator component 119 after the client device 106 has obtained a token from the enrollment discovery component 116. The administrator component 119 can require that client device 106 provide a token in order for the administrator component 119 to proceed with the enrollment process. In other words, the administrator component 119 may not proceed with enrolling the client device 106 with the management service 113 unless the client device 106 provides the token generated by the enrollment discovery component 116. The administrator component 119 can provide a console that facilitates administrators configuring and monitoring the status of the management service 113 and the client devices 106 enrolled with the management service 113. In some examples, the enrollment discovery component 116 can be shared among multiple enterprises, and the administrator component 119 can be dedicated to a single particular enterprise or group of enterprises. Thus, a single enrollment discovery component 116 can serve several enterprises, and respective administrator components 119 can serve individual enterprises or individual groups of enterprises.

The enterprise computing environment 103 can also include an enterprise data store 123. The enterprise data store 123 can be representative of multiple enterprise data stores 123 accessible to components in the enterprise computing environment 103. The enterprise data store 123 can store various data associated with the enterprise computing environment 103. For example, the enterprise data store 123 can store organizational groups 126, compliance rules 129, and management policies 133.

An organizational group 126 can be data representing a group of client devices 106 managed by the management service 113. In some examples, at least some of the organizational groups 126 can correspond to an enterprise's internal hierarchy or business structure. For example, an enterprise having an engineering team, an accounting team, and a marketing team can include an organizational group 126 that include members of the engineering team, another organizational group 126 that includes members of the accounting team, and another organizational group 126 that includes members of the marketing team.

At least some of the organizational groups 126 can correspond to locations relative to a facility associated with the enterprise. For example, an enterprise having office space with a public waiting room, private conference room, a laboratory, and an outdoor parking lot can have an organizational group 126 for the public waiting room, an organizational group 126 for the private conference room, an organizational group 126 for the laboratory, and an organizational group 126 for the outdoor parking lot. As will be described in further detail below, client devices 106 can be associated with respective organizational groups 126 based on their locations relative to a facility.

In some examples, the management service 113 can automatically generate organizational groups 126 based on locations of a facility associated with the enterprise. For example, the management service 113 can examine a floor plan of the facility and detect room or area boundaries using various techniques. For instance, if lines depicted on a floor plan represent room boundaries, the management service 113 can use edge detection techniques to identify the boundaries of rooms or areas represented in the floor plan and then generate organizational groups 126 that correspond to the identified rooms or areas.

A compliance rule 129 can specify one or more conditions that must be satisfied for a client device 106 to be deemed compliant with the compliance rule 129. In various examples, the enterprise computing environment 103, the client device 106, or both the enterprise computing environment 103 and the client device 106 can determine whether the client device 106 satisfies a compliance rule 129. For example, the client device 106 can generate a data object that describes the state of the client device 106 along with associated information, settings, and parameters. Components in the client device 106 or the management service 113 can evaluate the data object to determine whether the client device 106 is compliant with the compliance rule 129.

A compliance rule 129 can specify that particular applications are prohibited from being installed in the client device 106. As another example, a compliance rule 129 can specify that the client device 106 must be located in a secured location, such as in the facility of the enterprise that operates the enterprise computing environment 103, in order for the client device 106 to be authorized to access or render content in the client device 106. In another example, a compliance rule 129 can specify that a lock screen is required to be generated when the client device 106 is "awoken" from a low power "sleep" state and that a passcode is required for a user to unlock the lock screen.

Various compliance rules 129 can be based on time, geographical location, or device and network properties. For instance, the client device 106 can satisfy a compliance rule 129 when the client device 106 is located within a particular geographic location. The client device 106 can satisfy a compliance rule 129 in other examples when the client device 106 is in communication with a particular local area network, such as a particular local area network that is managed by the enterprise computing environment 103. Furthermore, a compliance rule 129 in another example can be based upon the time and date matching specified values.

A compliance rule 129 can specify that a client device 106 is required to be off or in a low power "sleep" state during a specified time period. Another compliance rule 129 can specify that a client device 106 is required to be on or in a normal operation "awake" state during a specified time period. As another example, a compliance rule 129 can specify that a client device 106 is prohibited from rendering content that has been designated as confidential.

Another example of a compliance rule 129 involves whether a user belongs to a particular user group. For instance, a compliance rule 129 can include a whitelist or a blacklist that specifies whether particular users or groups of users are authorized to perform various functionality, such as installing or executing a particular application.

In some examples, an enterprise can operate the management service 113 to ensure that the client devices 106 of its users satisfy respective compliance rules 129. By ensuring that the client devices 106 of its users are operating in compliance with the compliance rules 129, the enterprise can control resources and thereby improve the security of devices associated with the enterprise.

A management policy 133 can specify how a client device 106 associated with the management policy 133 is to be managed. For instance, a management policy 133 can specify which resources the management service 113 is permitted to provide to a client device 106. As an example, a management policy can specify whether the management service 113 is to provide an email service or a calendar service to a client device 106.

In addition, a management policy 133 can specify actions that a client device 106 is permitted or required to perform. To this end, compliance rules 129 can be assigned to a management policy 133. For example, a subset of the compliance rules 129 stored in the enterprise data store 123 can be assigned to a particular management policy 133 to specify the activity that a client device 106 is required to perform or is prohibited from performing.

As will be described in further detail below, a particular management policy 133 can be assigned to a particular organizational group 126. The management policy 133 can specify how the client devices 106 associated with the organizational group 126 are to be managed. For example, the management policy 133 can specify the activities that client devices 106 associated with the organizational group 126 are required to perform or are prohibited from performing. For instance, an organizational group 126 corresponding to a public waiting room of an enterprise's facility can be associated with a management policy 133 specifying that client devices 106 within the organizational group 126 are not permitted to render content designated as being confidential. The management policy 133 for the organizational group 126 can also require the client devices 106 within the organizational group 126 for the public waiting room to operate in a normal operation "awake" state during specified business hours and to be off or in a "sleep" state outside of the specified business hours.

The client device 106 can be representative of multiple client devices 106 that can be coupled to the network 109. The client device 106 can include a processor-based computer system, such as a networked television, telephone, lightbulb, closed-circuit television (CCTV) camera, printer, scanner, or cooking appliance. The client device 106 can also be a networked thermostat, smoke detector, carbon monoxide detector, or access credential reader, such as an employee access card reader. The client device 106 can be a stationary device. In this regard, the client device 106 can remain in a fixed location for relatively long periods of time.

The client device 106 can include a management component 136. The management component 136 can monitor and control components in the client device 106. For instance, the management component 136 can determine whether various compliance rules 129 are satisfied. In some examples, the management component 136 can parse a data object that describes the state of and settings in the client device 106 to determine whether the client device 106 satisfies compliance rules 129. In other examples, the management component 136 can communicate with the management service 113 to determine whether the management service 113 deems the compliance rules 129 satisfied.

In some examples, the management component 136 can be a portion of an operating system for the client device 106. In other examples, the management component 136 can operate in the application layer of the client device 106. For instance, the management component 136 can operate as a dedicated application that can monitor and manage data, software components, and hardware components associated with the client device 106.

Additionally, at least a portion of the management component 136 can be a portion of an application that provides functionality in addition to monitoring and managing resources in a client device 106. To this end, the enterprise computing environment 103 can provide a software development kit (SDK) that a developer of an application can use to insert security libraries and other components of the management component 136 into the application. In another approach, the management service 113 or the developer of the application can incorporate libraries and other components of the management component 136 into an application through a process known as "wrapping." To wrap an application, the developer or management service 113 can decompile the application and then insert the libraries into the decompiled application. The developer or management service 113 can then recompile the application with the added security libraries for a management component 136.

When a library for a management component 136 is incorporated into an application, the functionality provided by the library can be invoked by the management component 136 when executed in a client device 106. For example, if a security library provides the ability to monitor and enable or disable functionality provided by an application, a management component 136 can call functions provided by the library to monitor and enable or disable the functionality.

Next, examples of the operation of components in the networked environment 100 are described. The following description begins with the assumption that the client device 106 is not yet enrolled with the management service 113. The following description also assumes that the client device 106 is located within or near a facility associated with the enterprise that operates the management service 113.

To begin, the administrator component 119 can create a device record for the client device 106 and store it in the enterprise data store 123. The device record can include data related to the management of the client device 106 by the management service 113. For example, the device record can include one or more of: data describing the identity, type and components of the client device 106; data describing the state of the client device 106; data describing organizational groups 129 to which the client device 106 belongs; data describing compliance rules 129 with which the client device 106 must comply; data describing management policies 133 that specify if, when and how the client device 106 is permitted to function; and data describing a command queue associated with the client device 106.

For example, data describing the identity, type and components of the client device 106 can specify at least one of more of: a unique identifier associated with the client device 106 (e.g., identifier issued by a manufacturer of the client device or the management service 113), a device type of the client device (e.g., a smartphone, a tablet computing, a laptop computer, a desktop computer, a server computer, or a virtualized instance of any of such computer types), and various software and hardware components of the client device 106 (e.g., operating system (or kernel or bios) type and version, processor type and speed, memory type and size, network interface types, various I/O component types such as camera, touchscreen, keyboard, mouse, printer). More particularly, a device record associated with a client device 106 comprising a network connection television can specify that the client device 106 is a device type of television, can specify that the client device 106 has a wireless network interface, and can specify that the client device 106 has an active connection to the Internet.

Next, data describing the state of the client device 106 can specify, for instance, various settings that are applied to the client device 106, various applications that are installed on or being executed by the client device 106, and various files that are installed on or are accessible to the client device 106. Additionally, the data describing the state of the client device 106 can specify information related to the management of the client device 106, such as the last time the client device 106 provided its state information to the management service 113, whether the client device 106 is in a state of compliance with any applicable compliance rules 129, and whether any remedial actions have been (or are to be) taken as a result of a noncompliance with any applicable compliance rules 129. Also being related to the management of the client device 106, the data describing organizational groups 129 to which the client device 106 belongs can, for example, include any organizational groups 129 of which the client device 106 is a member (by virtue of a static hard coded relationship between the client device 106 and an organizational group 129, or by virtue of a dynamic evaluation of a membership condition associated with an organizational group 129, as described later herein).

Next, data describing compliance rules 129 with which the client device 106 must comply can, for instance, specify one or more remedial actions that should be performed in the event that an associated rule condition occurs, as described later herein. Further, data describing management policies 133 can include permissions of the client device 106 (e.g., access rights) and settings that are being enforced upon the client device 106 (to control if, when and how the client device 106 is permitted to function). In some embodiments, the data describing compliance rules 129 and the data describing management policies 133 is obtained from an organizational record associated with an organizational group 126 to which the client device 106 is a member (i.e., the compliance rules 129 and management policies 133 associated with the organizational group 126 are reflected in the device record of the member client device 106).

Finally, the device record can include data describing a command queue associated with the client device 106. For example, the management service 113 can maintain a command queue of commands that are designated for execution against the client device 106. As described herein, a client device 106 can be provisioned by the management service 113 by causing resources to be installed or stored on the client device 106. To implement such process, the management service 113 can store a command related to provisioning in the command queue. Additionally, the management service 113 can store a command related to a remedial action associated with a compliance rule 129 in the command queue, in the event that it is determined that a rule condition associated with the compliance rule 129 has occurred. Whether a provisioning command or a command related to a remedial action is stored in the command queue, the client device 106 can retrieve commands stored in its command queue through various ways that are described later herein (e.g., through a client-server "pull system" or through a client-server "push system").

In some examples, an administrator of the enterprise computing environment 103 can manually input data into the administrator component 119 in order to generate the record for the client device 106. In other examples, the administrator component 119 can obtain a data object, such as an electronic spreadsheet, an extensible markup language (XML) file, or a comma separated values (CSV) file, that includes information for multiple client devices 106. The administrator component 119 can extract information describing the client devices 106 from the data object to create corresponding device records for the respective client devices 106. The device record for each client device 106 can include information that identifies the respective client device 106 and information that indicates an address for the administrator component 119.

After the administrator component 119 creates the device record for the client device 106, the client device 106 can boot up, and the management component 136 can begin executing. The management component 136 can detect that the client device 106 is not yet enrolled with the management service 113. To this end, the management component 136 can determine whether a flag is set that indicates that the client device 106 is enrolled with the management service 113.

Upon detecting that the client device 106 is not enrolled with the management service 113, the management component 136 can automatically transmit information identifying the client device 106 to the enrollment discovery component 116. For example, the client device 106 can transmit a device identifier, such as its media access control (MAC) address, to the enrollment discovery component 116 at predefined URL specified in the management component 136.

Once the enrollment discovery component 116 receives the device information from the client device 106, the enrollment discovery component 116 can determine whether a corresponding device record exists in the enterprise data store 123. If there is no corresponding device record, the enrollment discovery component 116 can conclude that the client device 106 is not authorized to enroll with the management service 113.

Once the enrollment discovery component 116 identifies a device record that corresponds to the device information obtained from the client device 106, the enrollment discovery component 116 can transmit a token and the address for the administrator component 119. As described above, the token that can represent that the client device 106 has been authenticated and that the client device 106 is permitted to communicate and enroll with the management service 113. The enrollment discovery component 116 can specify the address for the administrator component 119 in the form of a URL in some examples.

The management component 136 can then generate location data. The location data can indicate the geographic location of the client device 106. In one example, the management component 136 can generate global positioning system (GPS) data that represents GPS coordinates of the client device 106. In another example, the location data can identify a local area network (LAN) to which the client device 106 is in communication, which the management service 113 can use to identify the location of the client device 106. In another example, locating beacons can be placed in the facility in which the client device 106 is located, and the location data can include beacon data based on received signals from the locating beacons. In addition, the location data can represent signal strength levels, which the administrator component 119 can use to determine the location of the client device 106 relative to a facility.

In other examples, the client device 106 can determine its location based on the locations of other devices to which the client device 106 can communicate. For example, the client device 106 can use BLUETOOTH communication channels, near field communication (NFC) communication channels, or wireless Ethernet communication channels to identify other nearby devices to which the client device 106 can communicate. The client device 106 can then determine the locations of the nearby devices and conclude that the location of the client device 106 is the near the locations of the nearby devices. For example, if the client device 106 determines that it can communicate with a printer and a copier located in a file room, the client device 106 can determine that the client device 106 is located in the same file room.

In alternative examples, the location data can be specified by an administrator of the enterprise computing environment 103. For example, the administrator can specify a location data variable identifying that the client device 106 is located in a particular room or area of a facility associated with the enterprise. The location data variable can be stored in the client device 106, and the management component 136 can generate location data based on the stored location data variable.

The management component 136 can then transmit the generated location data and the token received from the enrollment discovery component 116 to the administrator component 119. As discussed above, the enrollment discovery component 116 can provide the management component 136 with the address of the administrator component 119. As such, the management component 136 can transmit the token and location data to the specified address.

Once the administrator component 119 receives the token and location data from the management component 136, the administrator component 119 can authenticate the token. An authenticated token can indicate to the administrator component 119 that the administrator component 119 is authorized to communicate and enroll with the management service 113.

The administrator component 119 can use the received location data to determine the location of the client device 106 relative to a facility associated with the enterprise that operates the management service 113. For example, the administrator component 119 can determine whether the client device 106 is inside or outside the facility. In addition, the administrator component 119 can determine the particular area or room of a facility in which the client device 106 is located. For instance, the administrator component 119 can determine that the client device 106 is located in a public waiting room, a kitchen, a cubicle, a laboratory, a private conference room, or an outdoor patio area.

To determine the location of the client device 106 relative to the facility, the administrator component 119 can compare the location data provided by the client device 106 to data representing a floor plan of the facility. For example, the administrator component 119 can compare GPS coordinates or beacon data to data representing the boundaries of rooms and areas of the facility to determine whether the client device 106 is within the rooms and areas.

In alternative examples, the location data provided by the management component 136 can specify the location of the client device 106 relative to the facility. For example, the location data can specify the particular room or area in which the client device 106 is located.

After the administrator component 119 determines the location of the client device 106 relative to the facility, the administrator component 119 can associate the client device 106 with a particular organizational group 126 that corresponds to the determined location. For example, if the administrator component 119 determines that the client device 106 is located in a board room, the administrator component 119 can associate the client device 106 with an organizational group 126 for client devices 106 in the board room. As another example, if the administrator component 119 determines that the client device 106 is located in a storage room, the administrator component 119 can associate the client device 106 with an organizational group 126 for storage rooms. The administrator component 119 can associate the client device 106 with an organizational group 126 by, for example, storing data in the device record indicating that the client device 106 is in the organizational group 126.

In some examples, the management service 113 can identify devices with which the client device 106 can communicate using BLUETOOTH, NFC, or wireless Ethernet communication channels and then associate the client device 106 with an organizational group 126 to which the other devices are associated. For example, a client device 106 can notify the management service 113 that the client device 106 can communicate with a particular printer and television. The management service 113 can determine the organization group 126 to which the printer and television are associated and then associate the client device 106 to the same organizational group.

As described above, the management service 113 can associate a particular management policy 133 with an organizational group 126. A management policy 133 can specify how if, when, and how a client device 106 is authorized to function. A management policy 133 can specify that the client device 106 has such permission by virtue of the client device 106 being associated with an organization group 126 that is associated with the management policy 133. That is, the management policy 133 can be created (by an IT administrator specifying the permissions) without any reference to a particular client device 106; instead, the management policy 133 can be created and associated with an organizational group 126, which may, over time, include different client devices 106. In this way, a client device 106 becomes subject to the management policy 133 by virtue of becoming a member of the organizational group 126.

In one example, a client device 106 can become a member of (or become "associated with") an organizational group 126 when an administrator of the organizational group 126 specifies that the client device 106 should be a member (i.e., through a static hard coding). In another example, a client device 106 can become a member of the an organizational group 126 when a membership condition is satisfied (i.e., through a dynamic evaluation of the membership condition). A membership condition can be created by an administrator of the organizational group 126 by specifying a condition related to the client device 106 that, when satisfied, causes the membership of the organizational group 126 to include the client device 106. Conversely, the membership condition can also specify a condition related to the client device 106 that, when not satisfied, causes the membership of the organizational group 126 to exclude the client device 106.

It should also be understood that a client device 106 can become (or cease to be) a member of an organizational group 126 based on the users of the client device 106. In particular, through a static hard coding or an evaluation of a membership condition, a particular individual can be identified for membership within an organizational group 126. Once that particular individual has been identified as a member of the organizational group 126, one or more client devices 106 that the particular individual has or is using can become members of the organizational group 126. In this way, by virtue of a particular individual being a member of an organizational group 126, all the client devices 106 operated by the particular individual become subject to the management policies 133 (and compliance rules 129) associated with the organizational group 126—thereby controlling if, when, and how such client devices 106 may be operated by the particular individual.

As an example of the above, a particular management policy 133 associated with a particular organizational group 126 can specify that any client device 106 that is associated with the organizational group 126 is prohibited from accessing confidential resources associated with the organizational group 126. The particular management policy 133 can be associated with a membership condition that specifies that any client device 106 that is determined to be physically located within a public area (e.g., hospital waiting room) should be a member of the particular organizational group 126. As a result, the management service 113 can dynamically change the membership of the particular organizational group 126 such that the membership includes client devices 106 that are physically located within the public area. Further, the management service 113 can determine that, due to being a member of the particular organizational group, the client devices 106 located in the public area are prohibited from accessing the confidential resources associated with the particular organizational group 126. Thereafter, if the management service 113 determines that a client device 106 is no longer located in the public area, the management service 113 can remove the client device 106 from the membership of the organizational group 126, which further causes the client device 106 to no longer be prohibited from accessing the confidential resources associated with the organizational group 126 (assuming that the client device 106 is otherwise authorized to access the confidential resources).

In addition, as discussed above, the management service 113 can associate a management policy 133 with a compliance rule 129. A compliance rule 129 can specify a rule condition and an action that should be taken by the management service 113 if it is determined that the rule condition has occurred (i.e., a remedial action). In some embodiments, a rule condition of a compliance rule 129 can reflect the specifications of a management policy 133. For example, a compliance rule 129 can include a rule condition for an attempt by a member of a particular organizational group 126 to access confidential resources associated with the organizational group 126. In this way, the compliance rule 129 is configured to recognize attempts to thwart a related management policy 133. Continuing with the example, the compliance rule 129 can specify that access to a client device 106 from which the access attempt was made should be locked (i.e., the remedial action). In the event that the management service 113 (or the management component 136) determines that the rule condition of the compliance rule 129 has been triggered, the management service 113 (or the management component 136) can cause the remedial action of the compliance rule 129 to be performed or enforced.

When the client device 106 is associated with the organizational group 126, the management service 113 can apply the corresponding management policy 133 to the client device 106. For example, the management service 113 can permit or deny various services provided by the management service 113 to the client device 106, in accordance with the management policy 133. In addition, the management service 113 can enforce the compliance rules 129 associated with the management policy 133 against the client device 106.

The administrator component 119 can also provision the client device 106 with computing resources. In one embodiment, the administrator component 119 can provision the client device 106 by causing computing resources to be installed on the client device 106. For example, the administrator component 119 can place a command in a command queue of a device record associated with the client device 106, the command specifying a storage location of a computing resource and including instructions configured to cause the client device 106 to fetch the computing resource from the storage location. More particularly, as part of enrolling with the management service 113, the administrator component 119 can place a command in the command queue for a client device 106 that causes a "management profile" or a management component 136 to be installed on the client device 106. This in turn can cause the management service 113 to be designated as an administrator of the client device 106—granting the management service 113 permission to cause resources to be installed on the client device and to cause commands from the management service 113 to be performed by the client device 106.

In another embodiment, the administrator component 119 can provision the client device by causing the client device 106 to be configured to operate in accordance with management policies 133. For example, one management policy 133 can specify a requirement that the memory of the client device 106 be encrypted, another management policy 133 can specify a requirement that the client device 106 enforce a password to unlock the client device 106 from a locked state, and another management policy 133 can specify a requirement that the password have a particular character type included.

To cause the client device 106 to operate in accordance with these requirements of the management policies 133, the administrator component 119 can generate and provide the client device 106 with a configuration profile and instruct the client device 106 to install the configuration profile in a configuration profile bank in the memory of the client device 106. When installed in the configuration profile bank, the configuration profile causes settings of the client device 106 to reflect the specifications of the configuration profile, which in turn causes the client device 106 to comply with the particular management policies 133 by causing the memory of the client device 106 to be encrypted, causing a locked state function of the client device 106 to require a password to unlock a locked state of the client device 106, and causing a password complexity setting of the client device 106 to require that passwords include the particular character type (e.g., by rejecting user attempts to create and store passwords that do not include the particular character type).

The client device 106 can be provisioned by the administrator component 119 (and otherwise communicate with the administrator component 119) by utilizing either a client-server "pull system" or a client-server "push system." When utilizing the client-server "pull system," the management component 136 does not maintain an open network connection with the administrator component 119, but rather initiates all communications with the administrator component 119. When utilizing the client-server "push system," the management component 136 maintains an open connection 136 with the administrator component 119, which allows the administrator component 119 to freely transmit commands to the management component 136 (i.e., without having received a "client hello" message from the client device 106).

Returning to the client-server "pull system," the client device 106 can be configured to check-in with the administrator component 119 on a particular frequency (e.g., every four hours). In particular, the client device 106 can transmit a "client hello" message to the administrator component 119 that can include state information describing the current state of the client device 106 (which can be used by the management service 113 to update the device record associated with the client device 106 and to determine whether the client device 106 complies with any compliance rules 129 associated with the client device 106). Additionally, the "client hello" message can include a request that administrator component 119 transmit, to the client device 106, any commands stored in the command queue of the device record associated with the client device 106. In an instance in which the administrator component 119 receives such a "client hello" message from the client device 106, the administrator component 119 can query the command queue of the device record associated with the client device 106 to determine whether any commands are stored in the command queue. If the administrator component 119 determines that there is at least one command in the command queue, the administrator component 119 removes the command from the command queue (e.g., by copying the information comprising the command, encoding the information into instructions executable by the client device 106, and deleting the data representing the command from the memory of the client device 106) and transmits the executable instructions (i.e., the commands) over the network 109 to the management component 136 on the client device 106.

In one example, the administrator component 119 can transmit a command to the management component 136 which, when received and executed by the client device 106, instructs the client device 106 to fetch a configuration profile stored in the enterprise data store 123 of the enterprise computing environment 103. As a result, the client device 106 transmits a request to the administrator component 119 requesting that it transmit the configuration profile stored in the enterprise data store 123, which in turn causes the administrator component 119 to transmit the configuration profile to the management component 136. When the management component 136 receives the configuration profile, it causes the client device 106 to install the configuration profile in the configuration profile bank of the client device 106, which in turn causes settings of the client device 106 to be modified to reflect the instructions of the configuration profile (complying with any compliance rules 129 requiring that the client device 106 be configured in the manner specified by the instructions of the configuration profile).

As can be appreciated, the location of a client device 106 can change from time to time. For example, a networked television that was once located in a public waiting from can be moved to a private conference room. As such, the management component 136 can periodically transmit updated location data to the management service 113. In some examples, the management component 136 can transmit updated location data when the client device 106 is turned on or after a specified time duration. In other examples, the management component 136 can transmit updated location data in response to detecting that the location of the client device 106 has changed relative to a previous location.

Upon receiving updated location data, the administrator component 119 can determine the location of the client device 106 relative to a facility using one or more of the techniques described above. After determining the location of the client device 106 relative to the facility, the administrator component 119 can determine whether to associate the client device 106 with a different organizational group 126. For example, if the client device 106 remains located in the same room or area that corresponds to its current organizational group 126, the administrator component 119 can determine that the organizational group 126 should not change. Otherwise, if the administrator component 119 determines that the client device 106 is located in a room or area that corresponds to a different organizational group 126, the administrator component 119 can remove the association of the client device 106 with the previous organizational group 126 and associate the client device 106 with the organizational group 126 corresponding to the new location, using one or more of the techniques described above. In some examples, when the client device 106 is associated with an additional organization group 126, the management service 113 can detect that the client device 106 is associated with two organizational groups 126 and automatically disassociate the client device 106 with the previous organizational group 126.

Figure 2:
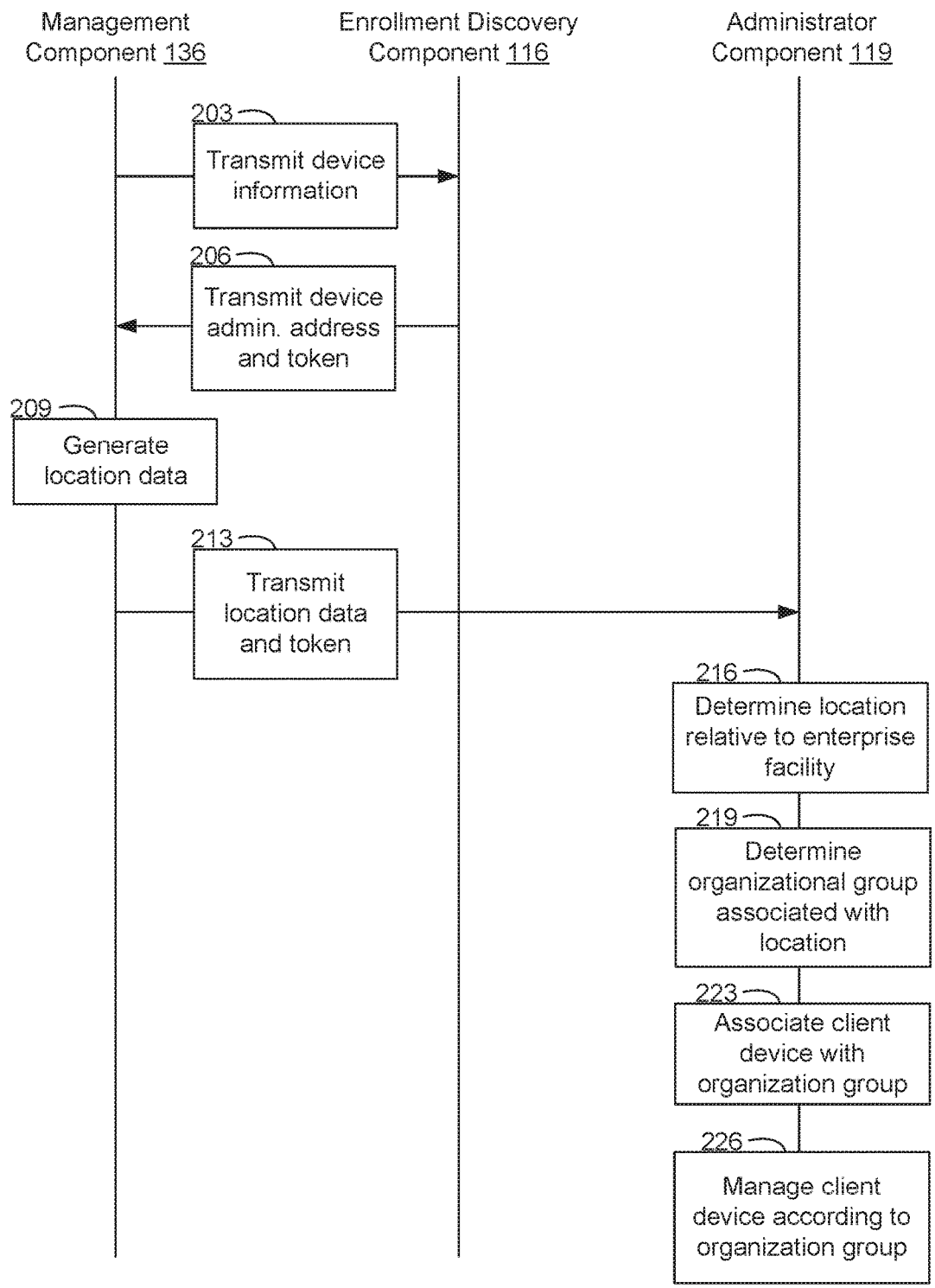
FIG. 2 is a sequence diagram illustrating an example of component interaction.

With reference to FIG. 2, shown is a sequence diagram illustrating an example of interactions of components in the networked environment 100. The sequence diagram of FIG. 2 illustrates an example of the client device 106 enrolling with the management service 113. The sequence diagram of FIG. 2 can begin after the management component 136 has been installed in the client device 106 and after the management component 136 has begun executing in the client device 106.

Beginning at step 203, the management component 136 can transmit device information to the enrollment discovery component 116. The device information can include a unique identifier for the client device 106, such as a MAC address for the client device 106. The device information can also include information that indicates the type of the client device 106. For example, the device information can indicate that the client device 106 is a networked television, CCTV, printer, scanner, telephone, or audio/visual system. Furthermore, the device information can include information that indicates the type and version of the operating system in the client device 106, so that the management service 113 can determine settings and applications to apply to the client device 106 when the client device 106 is enrolled.

As shown at step 206, the enrollment discovery component 116 can transmit a token and an address for the administrator component 119 to the management component 136. As described above, the management component 136 can provide the token to the administrator component 119 to indicate that the client device 106 is permitted to communicate and enroll with the management service 113. In some examples, the address of the administrator component 119 can be specified in the form of a URL.

At step 209, the management component 136 can generate location data that represents the geographical location of the client device 106. In various examples, the location data can be in the form of GPS data, network identifiers, beacon data, and received signal strength data. In other examples, the location data can be specified manually by an administrator of the client device 106. At step 213, the management component 136 can transmit the location data, along with the token received at step 206, to the administrator component 119.

Once the administrator component 119 obtains the location data from the management component 136, the administrator component 119 can determine the location of the client device 106 relative to a facility associated with the enterprise, as indicated at step 216. To determine the location of the client device 106 relative to the facility, the administrator component 119 can compare the location data provided by the management component 136 to data representing a floor plan of the facility. For example, the administrator component 119 can compare GPS coordinates or beacon data to data representing the boundaries of rooms and areas of the facility to determine whether the client device 106 is within the rooms and areas.

Then, as shown at step 219, the administrator component 119 can determine an organizational group 126 that is associated with the location of the client device 106. For example, if the client device 106 is located in a bathroom, the administrator component 119 can select an organizational group 126 that corresponds to the bathroom.

The administrator component 119 can then move to step 223 and associate the client device 106 with the organizational group 126. For example, the administrator component 119 can modify the device record for the client device 106 to specify that the client device 106 is assigned to the determined organizational group 126.

In some examples, associating the client device 106 with the organizational group 126 can involve generating or modifying a data structure that represents associations between particular client devices 106 and a particular organizational group 126. For instance, the administrator component 119 can generate a data structure representing an organizational group 126. The data structure can include sub-components having data representing particular client devices 106. By virtue of including a sub-component representing a particular client device 106 within a data structure that represents a particular organizational group 126, the administrator component 119 can indicate that the client device 106 is associated with the organizational group 126.

As shown at step 226, the administrator component 119 can then manage the client device 106 in accordance with any management policies 133 and compliance rules 129 associated with the organizational group 126. For example, the administrator component 119 can permit or deny various services provided by the management service 113 to the client device 106, in accordance with the management policy 133. Additionally, the administrator component 119 can provision the client device 106, as described above, the cause the client device 106 to operate in accordance with any applicable management policies 133 and compliance rules 129. In addition, the management service 113 can enforce the compliance rules 129 in an instance in which it is determined that a rule condition associated with the compliance rule 129 has occurred, by, for instance, causing a remedial action associated with the compliance rule 129 to be performed or enforced. Thereafter, the process can end.

Figure 3:
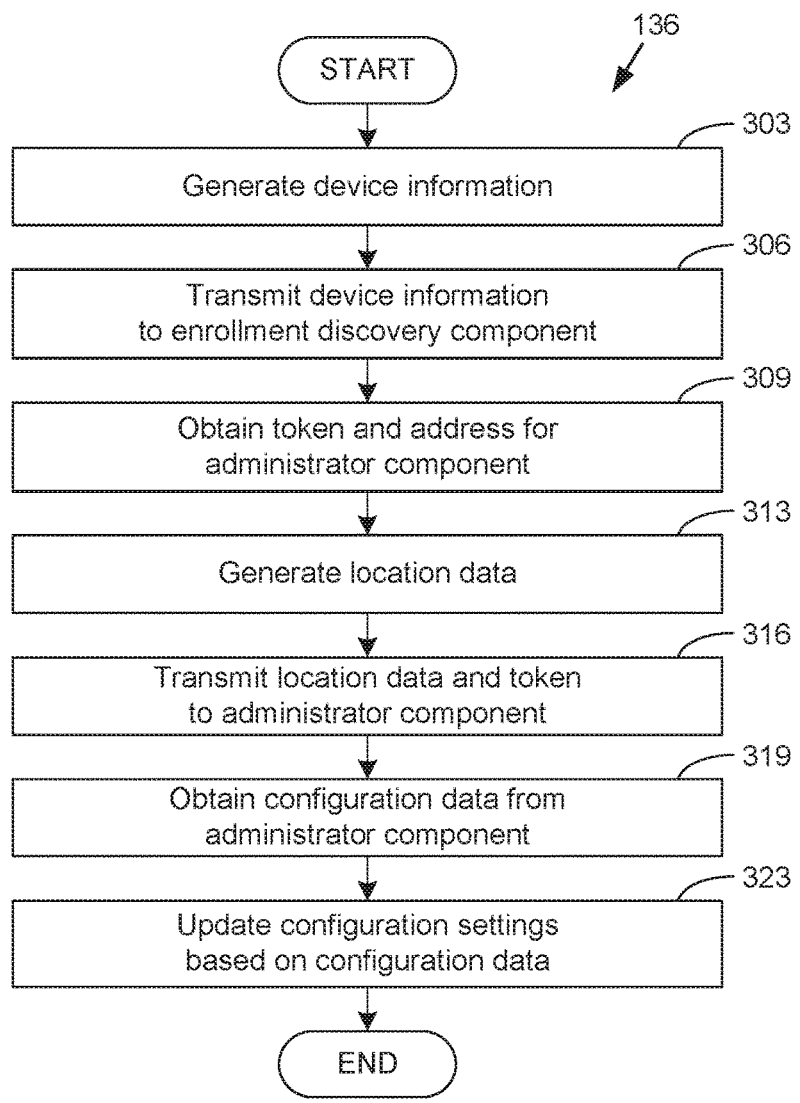
FIG. 3 is a flowchart illustrating an example of functionality implemented by a management component.

With reference to FIG. 3, shown is a flowchart that provides an example of a portion of the operation of the management component 136. In particular, FIG. 3 provides an example of the management component 136 enrolling with the management service 113. The flowchart of FIG. 3 can be viewed as depicting an example of a method implemented in the client device 106.

Beginning with step 303, the management component 136 can generate device information for the client device 106. The device information can include a unique identifier for the client device 106. For example, the device information can include a MAC address for the client device 106. In addition the device information can indicate the type of the client device 106. For example, the device information can specify that the client device 106 is a networked television, telephone, lightbulb, CCTV camera, printer, scanner, cooking appliance, thermostat, smoke detector, carbon monoxide detector, or access credential reader. As shown at step 306, the management component 136 can then transmit the device information to the enrollment discovery component 116.

At step 309, the management component 136 can obtain a token and address for the administrator component 119. As described above, the management component 136 can use the token to represent that the management component 136 is authenticated and authorized to communicate and enroll with the management service 113. The obtained address can include a URL for the administrator component 119 in some examples.

As shown at step 313, the management component 136 can then generate location data for the client device 106. In various examples, the location data can be in the form of GPS data, network identifiers, beacon data, and received signal strength data. In other examples, the location data can be specified manually by an administrator of the client device 106. At step 316, the management component 136 can transmit the location data and token to the administrator component 119 at the address specified by the enrollment discovery component 116.

The management component 136 can then obtain configuration data from the administrator component 119, as shown at step 319. For example, the management component 136 can obtain a configuration profile that configures settings for applications and an operating system in the client device 106. The management component 136 can then configure settings based on the obtained configuration data, as indicated at step 323. For example, the management component 136 can install the configuration component, causing settings for the operating system and applications in the client device 106 to be modified. Thereafter, the process can end.

Figure 4:
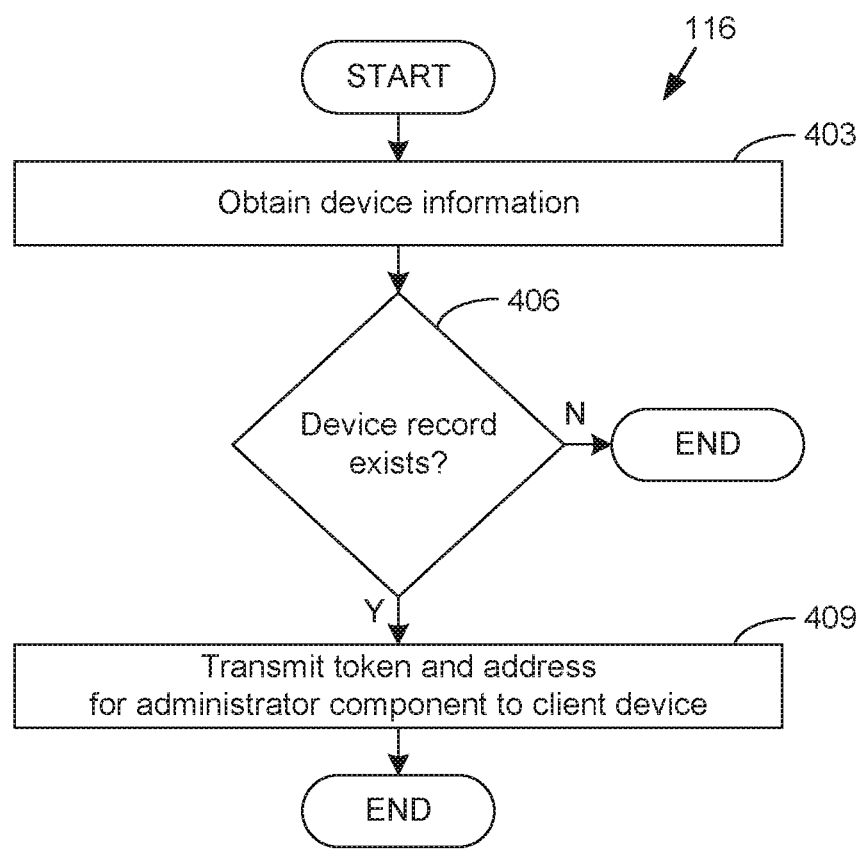
FIG. 4 is a flowchart illustrating an example of functionality implemented by an enrollment discovery service.

With reference to FIG. 4, shown is a flowchart that provides an example of a portion of the operation of the enrollment discovery component 116. In particular, FIG. 4 provides an example of the enrollment discovery component 116 providing the management component 136 with a token and address of the administrator component 119. The flowchart of FIG. 4 can be viewed as depicting an example of a method implemented the enterprise computing environment 103.

Beginning with step 403, the enrollment discovery component 116 can obtain device information from the client device 106. The device information can include a unique identifier, such as a MAC address, for the client device 106. In addition, the device information can indicate the type of client device 106. For example, the device information can indicate that the client device 106 is a networked television or lightbulb.

At step 406, the enrollment discovery component 116 can determine whether a corresponding device record exists for the client device 106 identified in the received device information. If no corresponding device record exists, the process can end as shown. In addition, the enrollment discovery component 116 can notify an administrator of the enrollment discovery component 116.

If a device record exists for the client device 106 identified by the device information, the enrollment discovery component 116 can move to step 409 and transmit to the client device 106 a token and address for the administrator component 119. As described above, the client device 106 can use the token to represent that the client device 106 is permitted to communicate and enroll with the management service 113. The address for the administrator component 119 can be represented in the form of a URL in various examples. Thereafter, the process can end.

Figure 5:
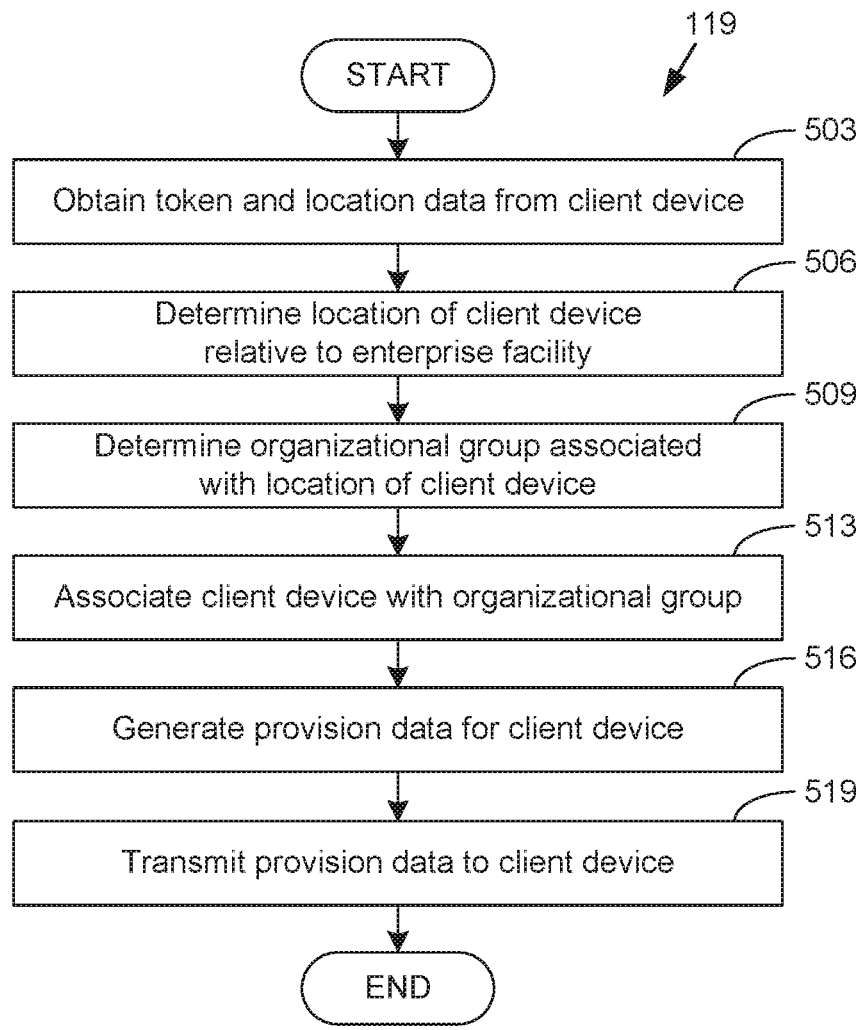
FIG. 5 is a flowchart illustrating an example of functionality implemented by a device administrator component.

With reference to FIG. 5, shown is a flowchart that provides an example of a portion of the operation of the administrator component 119. In particular, FIG. 5 provides an example of the administrator component 119 enrolling the client device 106 with the management service 113. The flowchart of FIG. 5 can be viewed as depicting an example of a method implemented in the enterprise computing environment 103.

Beginning with step 503, the administrator component 119 can obtain a token and location data from the client device 106. The token can indicate that the client device 106 is permitted to communicate and enroll with the management service 113. In various examples, the location data can be in the form of GPS data, network identifiers, beacon data, and received signal strength data. In other examples, the location data can be specified manually by an administrator of the client device 106.

At step 506, the administrator component 119 can determine the location of the client device 106 relative to a facility associated with the enterprise that operates the administrator component 119. To determine the location of the client device 106 relative to the facility, the administrator component 119 can compare the location data provided by the client device 106 to data representing a floor plan of the facility. For example, the administrator component 119 can compare GPS coordinates or beacon data to data representing the boundaries of rooms and areas of the facility to determine whether the client device 106 is within the rooms and areas. In addition, triangulation techniques can be used to determine the location of the client device 106 relative to the facility. For example, data from multiple cellular telephone towers can be used to triangulate the location of the client device 106.

As shown at step 509, the administrator component 119 can determine an organizational group 126 that is associated with the location of the client device 106. For example, if the client device 106 is located in a laboratory, the administrator component 119 can identify an organizational group 126 that corresponds to the laboratory.

Then, the administrator component 119 can associate the client device 106 with the organizational group 126, as indicated at step 513. For instance, the administrator component 119 can store data in a device record for the client device 106 indicating that the client device 106 is in the organizational group 126. In some examples, associating the client device 106 with the organizational group 126 can involve generating or modifying a data structure that represents associations between particular client devices 106 and a particular organizational group 126. For instance, the administrator component 119 can generate a data structure representing an organizational group 126. The data structure can include sub-components having data representing particular client devices 106 and data representing particular compliance rules 129. By virtue of including a sub-component representing a particular client device 106 within a data structure that represents a particular organizational group 126, the administrator component 119 can indicate that the client device 106 is associated with the organizational group 126. Also, by virtue of including a sub-component representing a particular compliance rule 129, the administrator component 119 can indicate that the compliance rule 129 is associated with the organizational group 126. Further, by virtue of including both a sub-component representing a particular client device 106 and a particular compliance rule 129, the administrator component 119 can indicate that the client device 106 must comply with the compliance rule 129 due to their respective associations with the organizational group 126.

At step 516, the administrator component 119 can generate provision data for the client device 106 based on the organizational group 126. As described herein, provision data can include For example, the administrator component 119 can generate a configuration profile that configures settings in the client device 106 in accordance with a management policy 133 that corresponds to the organizational group 126. The configuration data can also include compliance rules 129 that the client device 106 is required to satisfy. As shown at step 519, the administrator component 119 can then transmit the configuration data to the client device 106. Thereafter, the process can end.

The sequence diagrams and flowcharts discussed above show examples of the functionality and operation of implementations of components described herein. The components of the networked environment 100 described herein can be embodied in hardware, software, or a combination of hardware and software. If embodied in software, each step in the sequence diagrams and flowcharts can represent a module or a portion of code that includes computer instructions to implement the specified logical functions. The computer instructions can include source code that comprises human-readable statements written in a programming language or machine code that comprises machine instructions recognizable by a suitable execution system, such as a processor in a computer system. If embodied in hardware, each step can represent a circuit or a number of interconnected circuits that implement the specified logical functions.

Although the sequence diagrams and flowcharts show a specific order of execution, the order of execution can differ from that which is shown. For example, the order of execution of two or more steps can be switched relative to the order shown. Also, two or more steps shown in succession can be executed concurrently or with partial concurrence. Further, in some examples, one or more of the steps shown in the flowcharts can be skipped or omitted. In addition, any number of counters, state variables, warning semaphores, or messages can be added to the logical flow described herein, for purposes of enhanced utility, accounting, performance measurement, or troubleshooting aid.

The enterprise computing environment 103 and client device 106 can include at least one processing circuit. Such a processing circuit can include one or more processors and one or more storage devices that are coupled to a local interface. The local interface can include a data bus with an accompanying address/control bus.

A storage device for a processing circuit can store data and components that are executable by the one or more processors of the processing circuit. In some examples, at least portions of the management service 113 and management component 136 can be stored in one or more storage devices and be executable by one or more processors.

Components described herein can be embodied in the form of hardware, as software components that are executable by hardware, or as a combination of software and hardware. If embodied as hardware, the components described herein can be implemented as a circuit or state machine that employs any suitable hardware technology. Such hardware technology includes, for example, microprocessors, discrete logic circuits having logic gates for implementing various logic functions upon an application of one or more data signals, application specific integrated circuits (ASICs) having appropriate logic gates, or programmable logic devices, such as field-programmable gate array (FPGAs) and complex programmable logic devices (CPLDs).

Also, one or more or more of the components described herein that include software or computer instructions can be embodied in any non-transitory computer-readable medium for use by or in connection with an instruction execution system such as, for example, a processor in a computer system or other system. Such a computer-readable medium can contain, store, and maintain the software and computer instructions for use by or in connection with the instruction execution system.

A computer-readable medium can comprise a physical media, such as, magnetic, optical, semiconductor, or other suitable media. Examples of a suitable computer-readable media include solid-state drives, magnetic drives, flash memory, and storage discs, such as compact discs (CDs). Further, any logic or component described herein can be implemented and structured in a variety of ways. For example, one or more components described can be implemented as modules or components of a single application. Further, one or more components described herein can be executed in one computing device or by using multiple computing devices.

The examples described above are merely examples of implementations to set forth for a clear understanding of the principles of the disclosure. Many variations and modifications can be made to the examples described above without departing substantially from the spirit and principles of the disclosure. All such modifications and variations are intended to be included herein within the scope of this disclosure.

Therefore, the following is claimed:

1. A system, comprising:
 a computing device;
 a storage device storing a plurality of computer instructions executable by the computing device, wherein the plurality of computer instructions cause the computing device to at least:
  transmit device information associated with the computing device to a management system;
  receive an uniform resource location (URL) address associated with the management system;
  transmit a first location associated with the computing device to the URL address;
  receive a configuration profile from the management system, wherein the configuration profile is associated with the first location relative to a facility;
  configure at least one setting associated with an operation of the computing device based on the configuration profile;
  detect a second location associated with the computing device that is different from the first location; and
  transmit the second location to the URL address associated with the management system.

2. The system of claim 1, wherein the device information comprises a device type associated with the computing device.

3. The system of claim 1, wherein the configuration profile is associated with a management policy for the first location relative to the facility.

4. The system of claim 1, wherein configuring the at least one setting associated with the operation of the computing device based on the configuration profile further comprises causing memory associated with the computing device to be encrypted.

5. The system of claim 1, wherein the configuration profile comprises a first configuration profile associated with a first organizational group, and the plurality of computer instructions further cause the computing device to at least:
 receive a second configuration profile from the management system, wherein the second configuration profile is associated with the second location relative to the facility and associated with a second organizational group; and
 configure the at least one setting associated with the operation of the computing device based on the second configuration profile.

6. The system of claim 1, wherein receiving the configuration profile from the management system occurs in an instance in which a command has been received from the management system, wherein the command instructs the computing device to retrieve the configuration profile from the management system.

7. A non-transitory computer-readable medium storing a plurality of computer instructions executable by a computing device, wherein the plurality of computer instructions cause the computing device to at least:
 transmit device information associated with the computing device to a management system;
 receive an uniform resource location (URL) address associated with the management system;
 transmit a first location associated with the computing device to the URL address;
 receive a configuration profile from the management system, wherein the configuration profile is associated with the first location relative to a facility;
 configure at least one setting associated with an operation of the computing device based on the configuration profile;
 detect a second location associated with the computing device that is different from the first location; and
 transmit the second location to the URL address associated with the management system.

8. The non-transitory computer-readable medium of claim 7, wherein the device information comprises a device type associated with the computing device.

9. The non-transitory computer-readable medium of claim 7, wherein the configuration profile is associated with a management policy for the first location relative to the facility.

10. The non-transitory computer-readable medium of claim 7, wherein the configuring of the at least one setting associated with the operation of the computing device based on the configuration profile further comprises causing memory associated with the computing device to be encrypted.

11. The non-transitory computer-readable medium of claim 7, wherein the configuration profile comprises a first configuration profile associated with a first organizational group, and the plurality of computer instructions further cause the computing device to at least:
receive a second configuration profile from the management system, wherein the second configuration profile is associated with the second location relative to the facility and associated with a second organizational group; and
configure the at least one setting associated with the operation of the computing device based on the second configuration profile.

12. The non-transitory computer-readable medium of claim 7, wherein receiving the configuration profile from the management system occurs in an instance in which a command has been received from the management system, wherein the command instructs the computing device to retrieve the configuration profile from the management system.

13. A method, comprising:
transmitting, via a client device, device information associated with the client device to a management system;
receiving, via the client device, an uniform resource location (URL) address associated with the management system;
transmitting, via the client device, a first location associated with the client device to the URL address;
receiving, via the client device, a configuration profile from the management system, wherein the configuration profile is associated with the first location relative to a facility;
configuring, via the client device, at least one setting associated with an operation of the client device based on the configuration profile;
detecting, via the client device, a second location associated with the client device that is different from the first location; and
transmitting, via the client device, the second location to the URL address associated with the management system.

14. The method of claim 13, wherein the device information comprises a device type associated with the client device.

15. The method of claim 13, wherein the configuration profile is associated with a management policy for the first location relative to the facility.

16. The method of claim 13, wherein the configuring of the at least one setting associated with the operation of the client device based on the configuration profile further comprises causing memory associated with the client device to be encrypted.

17. The method of claim 13, wherein the configuration profile comprises a first configuration profile associated with a first organizational group, and further comprising:
receiving, via the client device, a second configuration profile from the management system, wherein the second configuration profile is associated with the second location relative to the facility and associated with a second organizational group; and
configuring, via the client device, the at least one setting associated with the operation of the client device based on the second configuration profile.

* * * * *